United States Patent [19]

Wade

[11] Patent Number: 5,077,075

[45] Date of Patent: * Dec. 31, 1991

[54] FRUIT JUICE MIX FOR WHIPPED AND/OR FROZEN APPLICATIONS

[75] Inventor: Bill R. Wade, Farmington, Wash.

[73] Assignee: The J. M. Smucker Company, Orrville, Ohio

[ * ] Notice: The portion of the term of this patent subsequent to Jun. 19, 2007 has been disclaimed.

[21] Appl. No.: 527,955

[22] Filed: May 17, 1990

Related U.S. Application Data

[60] Division of Ser. No. 297,699, Jan. 17, 1989, Pat. No. 4,935,258, which is a division of Ser. No. 872,703, Jun. 10, 1986, Pat. No. 4,816,283, which is a continuation-in-part of Ser. No. 681,248, Dec. 13, 1984, abandoned, and a continuation-in-part of Ser. No. 759,821, Jul. 26, 1985, Pat. No. 4,609,561.

[51] Int. Cl.$^5$ .............................................. A23L 2/02
[52] U.S. Cl. ..................................... 426/564; 426/565; 426/599
[58] Field of Search ................. 426/599, 590, 565-567

[56] References Cited

U.S. PATENT DOCUMENTS

| | | | |
|---|---|---|---|
| 2,131,650 | 9/1938 | Webb | 426/565 |
| 2,599,431 | 6/1958 | Bruce | 426/599 |
| 2,651,575 | 9/1953 | Talburt | 426/565 |
| 2,977,231 | 3/1961 | Fox et al. | 426/116 |
| 3,692,532 | 9/1972 | Shenkenberg et al. | 426/599 |
| 3,862,342 | 1/1975 | Maraulja et al. | 426/599 |
| 3,922,361 | 11/1975 | Vann | 426/599 |
| 3,922,371 | 11/1975 | Julien | 426/565 |
| 3,949,098 | 4/1976 | Bangert | 426/599 |
| 4,021,583 | 5/1977 | Arden | 426/565 |
| 4,235,936 | 11/1980 | Kahn et al. | 426/599 |
| 4,293,580 | 10/1981 | Rubenstein | 426/565 |
| 4,332,824 | 6/1982 | Kahn et al. | 426/599 |
| 4,433,000 | 8/1982 | DeLeon et al. | 426/599 |
| 4,486,413 | 12/1984 | Wiessenberger | 426/565 |
| 4,551,341 | 11/1985 | Blanie et al. | 426/495 |
| 4,609,561 | 9/1986 | Wade et al. | 426/599 |
| 4,724,153 | 2/1988 | Dulin et al. | 426/566 |
| 4,816,283 | 3/1989 | Wade et al. | 426/565 |
| 4,828,866 | 5/1989 | Wade et al. | 426/599 |
| 4,830,868 | 5/1989 | Wade et al. | 426/599 |
| 4,935,258 | 6/1990 | Wade et al. | 426/599 |

FOREIGN PATENT DOCUMENTS

4629188 8/1971 Japan .................................... 426/565

OTHER PUBLICATIONS

"Ice Cream" Third Edition, by W. S. Arbuckle, pp. 294-297.
"Model Food Legislation", Australian Government Publishing Service, Canberra 1986, pp. L1-1 to L1-8.
"National Health & Medical Research Council Model Food Standards Regulation Modifying Agents" Australian Government Publishing Service, 1985, pp. A10-1.
"The Diabetics Cookbook" by Roberta Longstaff, 1984.
Eating For Health by the National Heart Foundation Recipe Book, p. 79, 1975.
The Low Blood Sugar Cookbook by Francyne Davis, pp. 128 & 129, 1974.
Food Engineering, "Frozen Fruit Juice", Jun. 1977, pp. 22, 23, 26.

*Primary Examiner*—Jeanette Hunter
*Attorney, Agent, or Firm*—Body, Vickers & Daniels

[57] ABSTRACT

A fruit juice mix suitable for hard pack product made essentially from natural ingredients containing at least one fruit juice source in association with about 0.05 to 1.5 percent by weight of various stabilizers and preferably 0.30 to 0.60 percent xanthan gum based upon the total weight of the mix. An amount of water and other ingredients such that the blend has a brix value of greater than about 10 to about 35 and for more desirable results of 20 to 30 and preferably 20 to 25. No refined sugar or corn sweetener is added in or to the blend. Moreover, the juice mix can be frozen to form a hard pack material that can be stored at lower temperature, usually minus 18° C. and lower for days and then be warmed to minus 5 to minus 10° C. and be scooped out to be served and eaten without the appearance of being to icy, coarse, crumbly or gummy but exhibits a smooth, fine creamy texture and superior melt characteristics relative to soft pack.

58 Claims, No Drawings

FRUIT JUICE MIX FOR WHIPPED AND/OR FROZEN APPLICATIONS

CROSS REFERENCE TO RELATED APPLICATIONS

This is a division of application Ser. No. 297,699 filed Jan. 17, 1989, now U.S. Pat. No. 4,935,258. Which is a division of application Ser. No. 872,703 filed June 10, 1986, now U.S. Pat. No. 4,816,283, which in turn is a continuation-in-part of application Ser. No. 681,248 filed Dec. 13, 1984, now abandoned, and Ser. No. 759,821 filed July 26, 1985, now U.S. Pat. No. 4,609,561.

TECHNICAL FIELD

The present invention relates to a fruit juice mix suitable for hard pack applications which is essentially free from non-vegetable ingredients. More specifically, the present invention relates to a fruit juice mix for hard pack applications having a brix value of from about 10 to about 35 and generally 20 to 30 and containing various combinations of juices and stabilizers and especially xanthan gum therein and preferably containing on a dry weight basis from fruits about 35 to 75 percent fructose, about 20 to 45 percent glucose, and no more than about 20 percent of other sweeteners of the saccharide class, i.e., essentially free of refined sugars and corn sweeteners. Particularly, this invention relates to more storage-stable fruit juice mixes of the hard pack type and the gas incorporated products thereof wherein at least one of the juices may or may not have been subjected to treatment with an ion exchange resin or ultrafiltration to give a more stable juice mixture. Further this invention relates to the specialty class or superior or novelty hard pack formulations to compete with the superior or novelty grades of ice cream or the so-called novelty products such as chocolate-coated stick products, and the like.

BACKGROUND ART

Fruit juices including mixtures are available on the market in various forms such as unsweetened and sweetened, frozen and unfrozen, including concentrated and fully diluted. These fruit juices, in the frozen state, are characterized generally as exhibiting a crystalline structure in many cases that breaks into layers or lamina which frequently exhibits a needle-like structure with the crystals being most noticeable. Thus, these commercial frozen juices can, with their needle-like crystal structure, cause injury to the mouth. On the other hand, the frozen juices sold with a stick frozen therein are described as being quiescent in nature but exhibit the harsh feel in the mouth of crystalline ice or needles as contrasted with the soothing feel of the instant whipped or whipped frozen product. The prior art teaches how to avoid or reduce the above disadvantages and have generally added solids for the purpose of aiding the sweetening and freezing of the juices where these solids or additives are other than fruit juice origin and contains refined sugar, corn sweeteners, and the like, including artificial colors and flavors.

After World War II, there was an upsurge in popularity of soft frozen ice cream and drinks, which led to a desire to produce a soft frozen all-natural fruit juice. This desire has not been adequately attained because those who practiced the prior art found natural fruit juice would not produce a product acceptable to the consumer. When a person eats a frozen product, the taste buds are partially anesthetized and the juice concentrate has to be diluted to attain desired sweetness, or balance the tartness and flavor, high potency sweeteners or dextrose, sucrose, fructose, lactose and similar sugars are used.

Although applicant's copending applications referred to herein before supplied a commercially satisfactory and viable all fruit juice, soft serve product, this invention supplies a modification thereof that gives a superior hard pack product and allows specialty products to be made.

The present invention relates to a fruit juice mix which, in the whipped and/or frozen state, exhibits the absence from the mass of a unitary or essentially a unitary crystalline lattice network having shear planes less than about 0.1 up to about 0.5 centimeter in length and good storage stability. More particularly, the present invention relates to a fruit juice mix capable of being whipped and/or frozen having a brix value of greater than 10 to about 35 and generally 20 to 30 with various combinations of juice or juices, natural flavoring and stabilizers including xanthan gum to give a whipped and/or frozen mass having a soothing, creamy, satisfying mouth feel and taste in the mouth even after extended storage at minus 18° C. or lower as well as shelf life and heat shock stability.

A specific embodiment of this invention relates to use of ion exchange treated and/or ultrafiltrated juice or juices to give mixtures having improved storage stability at ambient to freezing temperatures and permitting products such as drinks and frozen creams to be made from a mix stored for months at ambient temperatures where the mix may have a flavor characteristic of the red, orange and yellow juices that are more difficult to store without losing their fresh taste or color as well as whipped frozen product losing their smooth, fine texture appearance or becoming icy, coarse and gummy.

DISCLOSURE OF INVENTION

It is therefore an aspect of the present invention to provide a fruit juice mix especially adapted for hard pack applications containing essentially natural components and exhibiting a fine creamy texture after prolonged storage.

It is another aspect of the present invention to provide a fruit juice mix for whipped and/or frozen and especially hard pack applications containing natural components, as above, wherein said mix has a sweetness value of from about 20 brix to less than about 35 brix and generally 20 to 30 and preferably, on a dry basis, a fructose content of 35 to 75 percent, a glucose content of 20 to 45 percent, and no more than about 10 percent of other sweeteners of the sacchride class which naturally occurs in that type of fruit and has a satisfying freezing range. A brix of 21 to 25 gives satisfactory and economical freezing ranges.

It is yet a further aspect of the present invention to provide a fruit juice mix for whipped and/or frozen and especially hard pack applications, as above, containing stabilizers therein, for example guar gum, locust beam gum, carrageenan, and specific amounts of xanthan gum or like products alone or mixed with other stabilizers.

It is a specific aspect of the present invention to provide a fruit juice mix for hard pack applications, as above, containing a stabilizer such as a vegetable proteins for instance a soy protein concentrate, or enzyme modified soy protein concentrate or related proteins such as egg white or wheat protein, which is used to improve and control the whipability, creaminess and texture of the finished product.

It is a still further aspect of the present invention to provide a fruit juice mix for whipped and/or frozen applications, as above, wherein various spices, natural flavors, and tartness additives can be utilized.

It is another aspect of the present invention to provide a fruit juice mix for whipped and/or frozen and especially hard pack applications, as above, wherein water is used to regulate the brix level and adjust solids to proper freezing and sweetness levels to permit them to be consumed without further dilution and to give good storage characteristic and melt down features with the absences or deleterious effects.

A special embodiment of the general invention hereof having the aspect of providing novel drinks and creams either whipped, frozen, thickened, chilled or cultured with the flavor and appearance of a juice having the colors such as the red, orange or yellow juices of strawberries, oranges or peaches and competitive with the so-called superior or premium grades of ice cream.

These and other aspects of the present invention will become apparent from the following detailed description of the invention in view of the Background Art.

In general, a fruit juice mixture, comprises: at least one type of fruit juice; from about 0.05 percent to about 1.5 percent by weight of at least one stabilizer based upon the total weight of said mixture, said stabilizer being derived from a natural source and being at least partly xanthan gum in preferred formulations; from about 0.05 percent to about 0.5 percent by weight of a soy protein or related protein, based upon the total weight of said mixture; an amount of remaining ingredients including water such that said mixture has an overall brix value of greater than 10 to about 35 and preferably 20 to 30, and said blend being free of sugar and corn sweetener additives. Also, it is desirable to increase the flavoring agents to give levels 25 to 50 percent higher than customarily used in soft pack formulations, usually it is desirable to reduce acid levels to adjust the tartness with the well known acidulents.

BEST MODE FOR CARRYING OUT THE INVENTION

A fruit juice mixture essentially contains all natural ingredients. By natural ingredients it is meant that it is obtained from a fruit, vegetable or related edible plant by crushing, squeezing and related operations. It then may be filtered, strained, passed through a sieve, resin beds, clay or diatomaceous earth bed or filters, ion exchanged resins to give a juice, a juice concentrate, purees, and concentrates or so-called modificed juices. Although the fruit juice mixture generally may be frozen and edible as such, that is as a soft serve, it is preferably in this invention to use the mix for a aerated hard pack or novelty form such as frozen on a stick or in mixtures as a ripple type product or fruit part creams. The mixture contains at least one type of fruit juice although a combination of various juices as well as types thereof can be utilized. By the term fruit juice it is meant any type of juice which is extracted from fruit by any conventional means such as pressing. That is, the juice itself contains types of saccharides preferably a majority of monoscchrides which naturally occurs in that type of juice, as extracted from plants by any one of the well known methods. Specific types of juices which can be utilized in the present invention include fruit juice, concentrated fruit juice, fruit puree, fruit puree concentrate, juices which have been modified, that is modified juice, as well as modified concentrated juice and the like. Modified juices would include ion exchange treated and/or ultrafiltered juices. Examples of a few of the many specific juices which can be utilized in the present invention include, for example, peach concentrate, pear concentrate, blackberry puree, cranberry juice, orange juice concentrate, grape concentrate, lemon juice and apple juice concentrate. Of course, many other types of juices whether in the form of a puree, concentrate, or a juice can be utilized depending upon the desired end flavor.

The type of juice source, such as fruit juice, fruit juice concentrate, fruit puree, fruit puree concentrate, fruit juice concentrated puree, modified juice as well as their concentrates has a sweetness due to the natural saccharide content contained therein. The degree of sweetness is generally listed by a brix value. Brix is generally defined as the percent of soluble solids primarily made up of natural sugars. The fruit juice mixture of the present invention, generally has an overall brix value of from about 10 to about 35 generally the range will be 21 to 25, once the other ingredients, such as water, stabilizers, natural flavors and the like, as noted hereinbelow, have been added to the juices. In other words, a sufficient amount of water and the like is added to dilute the concentrated juice from the source such that it has a brix value of from about 10 to about 35 and generally 20 to 30. A blend having a brix value of 35 or greater generally tends to be too sweet and is difficult to freeze. On the other hand, the juice mixture having a brix value of less than 10 generally tends to be too sour as well as too icy when frozen. A more desirable brix range is from about 20 to about 27 with 23 to 26 being preferred. The brix value of approximately 25 is optimum for most juices. These brix values are obtained without the use of lactose or refined sugar or corn sweeteners, as is the practice in making ice cream.

Stabilizers are used in the present invention to give body as well as good texture, heat shock stability and improve stability of overrun and melt down to the overall mixture. The stabilizers are derived from natural sources such as plants and the like, although some of the stabilizers may have been modified in order to render them stable and food-grade functional or clean. Examples of stabilizers which are utilized and generally preferred in the present invention include guar gum, locust bean gum, and carrageenan. Especially preferred is xanthan gum as it gives less body and results in a lower viscosity of the mix as well as gives easier air or gas emulsibility and greater stability to the emulsion without generation of great elasticity or gumminess. In addition to these basic types of stabilizers, other types can be utilized such as various alginates which are generally made from seaweed, various cellulose gums, various pectins, and the like. Such stabilizers are well known to those skilled in the art as well as the literature. The stabilizers render the juice mix uniform and also tend to control the stability and the consistency of the mix when frozen. That is, a more creamy consistency is generally obtained with less visible ice crystals, when the above gums are used in combination with xanthan gum a superior hard pack product is obtained.

The stabilizers may be selected from a group consisting of guar gum, locust bean gum, xanthan gum, carrageenan, an alginate, a cellulose gum, a pectin, hydroxyethyl cellulose, hydroxypropyl cellulose, carboxymethyl cellulose, microcrystalline cellulose, amidated pectin, propylene glycol alginate, modified starches, maltodextrins, gelatin, polydextrose, hydroxypropylmethyl cellulose, methylcellulose, methylethyl cellulose, ethylcellulose, and combinatins thereof.

Conveniently the juice type is selected from the group consisting of fruit juice, fruit juice concentrate, fruit juice puree, fruit juice puree concentrate, modified juice, and modified juice concentrate.

The overall amount of said stabilizers usually may be from about 0.30 percent to about 0.60 percent by weight.

Preferably the protein comprises a vegetable protein, such as soy protein or wheat protein, but we also envision being able to use protein from animal sources such as milk protein or egg albumen.

The protein preferably is at a level of at least 0.05 percent based on the total weight of the mixture.

The total amount of all stabilizers utilized is generally at least 0.05 percent to about 1.5 percent with the desired range being 0.3 to 0.6 percent by weight based upon the weight of the entire juice mix. Lesser amounts tend to result in separation of the various ingredients whereas higher amounts tend to result in a very viscous mixture which is difficult to mix. Lesser amounts also tend to yield whipped aerated hard pack product with weak body, coarse or icy consistency, and poor meltdown stability while higher amounts tend to result in gummy or elastic body and unnatural meltdown qualities. If the amount of an individual stabilizer utilized is reduced, it is usually compensated by the use of a similar increased amount of another stabilizer so that the overall amount generally remains the same. Typically, the total amount of guar gum utilized is approximately 7 gms./gal. to about 12 gms./gal. with from about 0.17 percent to about 0.23 percent of this gum being preferred. The amount of the carrageenan is from about 0.05 to about 0.30 percent with from about 0.08 percent to about 0.14 percent of this gum being preferred. The remaining stabilizer xanthan gum, in amounts of 0.02 to 0.3 percent of total product gives a very good hard pack product.

Another ingredient which is utilized is vegetable protein such as soy protein. Generally, any modified type of soy protein can be utilized. The purpose of the soy protein is to improve and control the whipability of the fruit juice mix for whipped and/or frozen and hard pack applications to make it creamier. It thus enhances the overrun upon whipping of the frozen material to take up air such that a creamier, ice cream like appearance or whipped cream type consistency is achieved. The amount of soy protein is generally from about 0.05 percent to about 0.5 percent, with from about 3 to about 13 grams per gallon of formulation being utilized. Approximately 4 to 6 or 7 grams is highly preferred.

The amount of water will vary over a wide range, depending on the concentration of the juice mixtures to bring the product to the desired brix range.

Other ingredients which may be utilized are natural flavors and/or spices to establish standardized optimum flavor levels for said flavor. Examples of natural flavors include nutmeg and cinnamon in small amounts such as from about 0.05 percent to about 0.07 percent by weight, and natural flavors derived from concentrates of essential oils or botanicals or essences. For hard pack, it is some times desirable to increase the flavoring levels by approximately 20 to 50 percent. Hence, the hard pack formulation frequently will contain 0.05 to 1.50 percent by weight of the flavoring ingredients. Naturally, other specialty type ingredients can also be utilized in similar amounts. Any natural flavoring ingredient can be used to make flavors, ranging from tropical fruits, pumpkin, to pizza, if desired.

Generally, small amounts of various flavor enhancers or modifiers, generally food grade acids, can be utilized to impart tartness, enhance flavor, prevent oxidation of the ingredients or the like. For example, citric acid and other organic acids such as malic acid may be utilized to impart tartness or accentuate the flavor of the mixture. The amounts of such acids generally range from about 0.05 to 1.0 percent by weight apart from the levels of total acids from juice sources, etc. The titratable acidity of the mix would generally range from 0.15 to 0.8 percent and preferably 0.4 to 0.65 percent. In order to prevent oxidation of the ingredients, commonly called browning, ascorbic acid can be utilized as in an amount from about 0.02 to about 0.10 weight percent, and preferably from about 0.05 percent to about 0.08 percent by weight based upon the total weight of the overall fruit juice mixture.

These acids are also utilized to ensure that the pH of the mix is below pH 4.6 and preferably below pH 4.0 for the purpose of microbiological control. Another advantage is that generally lower processing temperatures can be utilized at these pH levels with aseptic processing of this mix thus imparting less heat derived stress on the fruit juice system. The acids are also used to standardize the titratable acidity or tartness perception of the finished mix as variations occur in raw material maturity.

MIXING

The mixing procedure for forming the fruit juice mix is generally as follows:

The primary fruit juice or concentrate thereof, such as apple juice concentrate, is added to a makeup tank. Next, all of the remaining fruit juices or concentrates, viz., modified or puree, are added. Then all the remaining liquid ingredients, including purees, flavors, enhancers, colors and the like are added and mixed for approximately 5 minutes or more depending on size of mixture and efficiency of the mixing equipment. Approximately 50 percent by weight of the water is added holding out a sufficient amount of water to be utilized in mixing with the stabilizers. One-half of the withheld water is usually at about 10° C. to about 37° C. and the stabilizer is slowly added thereto, generally maintaining a good vortex in the stabilizer mixing tank. After the stabilizer has been thoroughly dispersed and no lumps are contained therein, usually about 10 minutes, the water dispersion of the stabilizer is slowly added to the water diluted mix and thoroughly incorporated therein. The balance of the water is used to wash out the stabilizer mixing tank and to ensure all the stabilizer is transferred to the diluted juice tank. The last water addition is stirred to give a uniform mix. This mix may be refrigerated to await containerization in suitable shipping packaging. Before packaging, the mix is deaerated through aeration equipment such as Dole Vacuum De-aerator at vacuums of 15 inch Hg, then raised to commercial sterilization temperature, about 183° F. to about 205° F. for about 2 minutes to about 8 seconds and then cooled and aseptically packaged to await use or shipment to the point where it will be frozen into hard pack form. Alternatively, the product at about 183° F. to 205° F. is added to the container and the closed container is then cooled to the storage temperature in what is generally called the hot pack system to await use or shipment to the use point.

Alternatively, the fruit juice mix could be made at the hard pack freezing location and processed at either hot or cold temperatures depending on the type of stabilizers used and the micribiological aspects of the mix.

At the hard pack freezing location, the juice is poured into a machine known to the ice cream trade as an ice cream type making machine. Here it is cooled and frozen as well as whipped with air or gas to produce a frozen flavorable mixture of either soft serve or hard frozen mixture, depending on recipe, on the temperature and the time in the machine and the equipment being used. Those of ordinary skill in the ice cream trade will immediately see other apparatus that could be used to process the juice mixes of this invention, including the whipped creams and soft and hard frozen creams.

The invention will be better understood by reference to the following representative and illustrative examples where all parts and percentages are by weight unless otherwise designated.

EXAMPLE 1

A wild berry flavored fruit mixture capable of being frozen to yield a hard pack product was made utilizing the following mixing procedure rather than the more generalized one above.

In a batching kettle, 3.75 pounds of malic acid was dissolved in 300 gallons of water to give a malic acid solution. Then, 71.0 gallons of the concentrate of apple juice, 70 brix deionized 9.76 gallons wild berry #227 flavor were added with agitation to the malic acid solution and stirred until a smooth blend was obtained. Sixty gallons of deionized concentrate of apple juice, 70 Brix, was added to a mixing vat with the mixer speed raised to high and then the gums were added individually: xanthan gum—2.8 pounds, guar gum—9.7 pounds, and carrageenan—4.1 pounds and stirred until smooth.

Then, 30 gallons of water and 6.6 pounds of soy protein, were added to the mixing vat. When the blend appeared to be smooth, it was pumped through a strainer bag to the batching kettle. The agitation in the batching kettle was continued for 5–10 minutes as 30 gallons of remaining water, and 1.25 pounds of malic acid was added and stirred in to give 500 gallons of mixture. This mixture had a brix range of 23.6 to 24.4, a pH of 3.6 to 4.1 and a titratable acidity of 0.46 to 0.54 and wild berry flavor. This mixture was then hard frozen and placed in cold storage at about minus 20° C. for several days and then removed from cold storage and allowed to warm to minus 18° C. The product exhibited excellent hard pack properties such as being free of appreciable ice crystal growth, stringiness or gumminess and when scooped out into a dish with an ice cream scoop, melted down wthout losing its creamy appearance for an appreciable time.

The recipe may be mixed, frozen and processed in any machine designed to freeze ice cream or yogurt to give a frozen aerated mix having a very good, soft consistency and a delicious flavor.

EXAMPLE 2

The ingredients of Table I were mixed in the batching kettle as described in Example 1.

TABLE I

| | |
|---|---|
| Water | 275.0 gal. |

TABLE I-continued

| | |
|---|---|
| Malic Acid | 3.75 lbs. |
| Concentrate, Apple 70 BX Deionized | 67.5 gal. |
| Puree, Strawberry Seedless 7 BX | 224.0 lbs. |
| Flavor, Strawberry #825 | 11.9 gal. |
| Color, Beet B-40 | 1.0 gal. + 25.0 fl. oz. |

Then the ingredients in Table II A, B and C were mixed in the marshmallow mixer in sequence A, B and C as described in Example 1 and then pumped to the batching kettle to form a strawberry hard pack product having a strawberry flavor, a brix of 23.0 to 24.3 and a pH of 3.5 to 4.5.

TABLE II(A)

| | |
|---|---|
| Concentrate - Apple Juice 70 BX deionized | 60.0 gal. |
| Xanthan Gum | 2.8 lbs. |
| Guar Gum | 9.7 lbs. |
| Carrageenan | 4.1 lbs. |

TABLE II(B)

| | |
|---|---|
| Water | 35.0 gal. |
| Soy Protein | 1.25 gal. |

TABLE II(C)

| | |
|---|---|
| Water | 26.0 gal. |
| Malic Acid | 1.25 lbs. |

As is apparent from the above examples, it should be appreciated that numerous other formulations and flavors can be made within the scope of the present invention utilizing all natural ingredients, including juices, purees, modified juices and the like, natural stabilizers, proteins, viz., soy protein, natural flavor, water and the like.

When using the so-called modified juices such as juices that have been passed through an ion exchange resin to contact the juice with the resin which removes color and flavor bodies, readily oxidized or unstable bodies and the weak fruit acids, it is desired to use the mixing procedure of Example 3. As is well known, absorbants such as charcoal or special carbons as well as the absorbent resins such as the well known anion and cation resins and porous membranes or packing of ultrafiltration methods are used to purify juice products. In the instant invention, optimization of the acid-sweetness ratio and removal of color and flavor are achieved by this same technique. We have discovered that juices which have been subjected to an absorbent treatment of about 10° C. to about 60° C. and filtering away of the absorbent or permitting the juice to flow away from the resin or porous membrane or packing offers unique opportunities for making products having unique properties such as storage stability at temperatures above the freezing temperature of the juice mixture and especially hard pack material. Also, the modified juices are excellent for enhancing or fortifying the mixture. Specifically, a relatively long life strawberry, peach or orange drink or hard pack mix is possible where the drink can be held at room temperature in a manner simulating the practice with aseptic packed apple and/or pear juice or white or purple grape juice or can be frozen and handled as a hard pack product.

EXAMPLE 3

A peach flavored hard pack product was made by charging the ingredients in Table III(A) below to a batching kettle with agitation in the order listed in the table to give a smooth blend.

TABLE III(A)

| | |
|---|---|
| Water | 180.0 gal. |
| Ascorbic Acid | 2.2 lbs. |
| Concentrate, Apple Juice 70 BX deionized | 57.0 gal. |
| Puree, Peach 10 BX (1,220 lbs.) | 142.0 gal. |
| Flavor, Peach #215 | 6.0 gal. |
| Flavor, Peach #237 | 2.0 gal. |
| Annatto, Hansen's (color additive) | 32.0 fl. oz. |
| Beet Color, Hansen's - B-40 | 15.3 fl. oz. |

Then, the gums, i.e., xanthan gum (2.8 pounds), guar gum (9.7 pounds) and carrageen (4.1 pounds) were mixed with 60 gallons of apple juice concentrate 70 brix in a mixing vat followed by 30.0 gallons of water and 7.7 pounds of soy protein to give a smooth blend. The blend was pumped through a strainer to the batching kettle where 23.0 gallons of water was added to give 500 gallons of peach flavored hard pack mix.

Alternately, this juice mixture may be heat treated at about 90°–95° C. for about half a minute, cooled and packed in aseptic containers such as about 50 gallon bags and stored or shipped to the customer. At the customer's, the juice mixture was charged to a continuous ice cream freezing machine to form a soft creamy all-fruit juice, peach flavored frozen cream that could be sold and eaten like ice cream. The taste and flavor was good and simulated the taste of peaches. Preferably, the soft frozen cream is placed in cold storage to form a hard pack product.

EXAMPLE 4

The procedure of Example 3 may be used with deionized apple juice 72 brix to form a peach flavored juice mixture or with the procedure of Example 1 to produce a strawberry juice mixture suitable for hard pack by adjusting water content to give a brix preferably of 21 to 24. It should be appreciated that either high acid or low acid apple juice may be used with suitable adjustment of the acid level to give a titratable acid level within range of 0.4 to 0.7 and a pH of preferably 2.5 to about 4.6.

Instead of deionized juice of Example 4, a juice which has been subjected to ultrafiltration may be used to produce products of this invention.

EXAMPLE 5

An example which would not have to utilize deionized or ultrafiltered juice such as Apple Hard Pack Mix comprised of

| | |
|---|---|
| Water | 2972.4 lbs. |
| Apple Juice Concentrate 70 Brix | 1558.9 lbs. |
| Apple Essence | 45.4 lbs. |
| Xanthan Gum | 2.8 lbs. |
| Guar Gum | 9.7 lbs. |
| Carrageenan | 4.1 lbs. |
| Soy Protein | 7.7 lbs. |
| Brix | 20–30 |
| Titratable Acids | 0.15–0.8 |
| pH | 2.5–4.6 |

Frozen to overrun of 20 to 150 percent. Processed in same manner as others.

EXAMPLE 6

| | Grams/Gallons |
|---|---|
| Pear Concentrate 70 Bx Deionized | 1,217.1 |
| Blackberry Puree | 207.0 |
| Wildbery Flavor, Natural | 82.8 |
| Microcrystalline Cellulose 591 | 41.3 |
| Stabilizer Blend CC101* | 20.6 |
| Ascorbic Acid | 2.0 |
| Water | 2,568.3 |
| Total | 4,139.1 |
| Brix | 23.0 |
| pH | 4.2 |
| Titratable Acidity | .52 |

Add ½ water to high speed mixer. Add microcrystalline cellulose. Blend 20 minutes until smooth. Add to batching tank with Pear Concentrate, Blackberry Puree, Natural Flavor, and Ascorbic Acid.

Add remaining water to high speed mixing vat. Add stabilizer blend. Blend 5 minutes until smooth. Add to blending tank. Blend 5 minutes, Pump to aseptic processor.

EXAMPLE 7

| | Grams/Gallons |
|---|---|
| Water | 2,698.3 g. |
| Ascorbic Acid | 2.0 |
| Citric Acid | 12.0 |
| Apple Concentrate 70 BX Deionized | 1,400.0 |
| Lemon Concentrate | 1.2 |
| Lemon Flavor Natural | 10.3 |
| Tumeric | 4.5 |
| Soy Protein | 3.0 |
| Guar Gum | 6.6 |
| Xanthan Gum | 1.9 |
| Carrageenan | 2.8 |
| Microcrystalline Cellulose (Avicel RC591) | 31.4 |
| Total | 4,174.0 |
| Brix | 25.0 |
| Titratable Acidity | .51 |
| pH | 3.8 |

Add ½ water to high speed mixing tank. Add microcrystalline cellulose and blend for 20 minutes until smooth. Add to batching kettle with apple concentrate, tumeric, flavor, lemon concentrate and acids. Add remaining water to high speed mixing vat. Add dry blended gums to water. Blend for 5 minutes until smooth. Add protein and blend 1 minute until smooth. Add to mixing tank and blend 5 minutes. Pump to aseptic processor.

The formulas of Examples 6 and 7 showed excellent freezing characteristics, texture and body, melt down, and heat shock stability. The shelf life storage tests and heat shock stability are slightly better than formulas not utilizing microcrystalline cellulose.

The formula of Example 6 which utilizes microcrystalline cellulose, does not require whipped protein for creamy texture and good aeration stability. Example 7 utilizes microcrystalline cellulose with reduced protein level.

Other forms of hard pack are as follows:

(1) Use of the present mix which would be utilized in the same package with two different overruns. Product of 70 to 90 percent overrun could be swirled with product of 20 to 40 percent overrun in a proportion of 2 parts to 1 part. This can be accomplished through an ice cream plant with two different freezing barrels which feed at two different speeds through one filler into the same package. The lower overrun will have a higher flavor and color intensity swirled (like rainbow sherbet) or side by side (like neopolitan) with the lighter, creamier higher overrun product. This concept could utilize the same flavor mix or a number of different flavor mixes such as wildberry and lemon.

(2) Use of the mix of the instant invention which would be frozen at 70 percent overrun through a freezer barrel with a variegating sauce (following the same marketing concepts) added by way of a variegating pump. In this concept, the variegating sauce may be the same formula as the present mix or modified to perform closer to that of a traditional variegating sauce. Variegating sauces are fed into the frozen product as it comes from the freezing barrel prior to the filler for the package. The variegating sauce is nonaerated or frozen when it is fed into the frozen whipped hard pack. Listed below is the formula for a variegating sauce following the marketing concepts:

STRAWBERRY VARIEGATING SAUCE

|  | Percentage |
| --- | --- |
| Strawberry Puree Seedless | 40.00 |
| Apple Concentrate 70BX deionized | 49.80 |
| Water | 6.20 |
| Pectin Low Methoxyl | .50 |
| Locust Bean Gum | .50 |
| Malic Acid | .10 |
| Strawberry Flavor Natural | 2.60 |
| Beet Color | .30 |
| Total | 100.00 |

Most variegating sauces are like jams and do not contain fruit particulates. Most variegating pump nozzles cannot accept very large particulates where the sauce is pumped into the frozen whipped stream. The variegate is normally refrigerated.

(3) Another variation could be made that would utilize fruit particulates which have been processed with deionized apple or pear concentrate to produce a higher brix fruit particulate which is fed into the frozen end product by means of a fruit feeder. The fruit feeder is a device made to introduce and disperse particulates into the stream of the frozen whipped product (without grinding them up) as it comes from the freezing barrel. The frozen whipped product would be our standard hard pack mix frozen at 70 percent overrun.

The fruit particulates, such as sliced or whole strawberries, are processed with the concentrates to raise the brix from its natural 7-10 percent level to 20-40 percent brix. This allows the fruit particulate to remain softer in the frozen state than its natural brix which is icy and approximately as hard as an ice cube.

Listed below is the formula for processed sliced strawberries:

|  | Percentage |
| --- | --- |
| Sliced Strawberries | 74.7 |
| Deionized Apple Conc. 70 Brix | 25.0 |
| Beet Color | 0.3 |
| Total | 100.0 |
| Brix - 23.5 percent |  |
| pH - 4.0 percent |  |

The strawberries need to sit in the concentrate in refrigeration for at least 2-4 days for the transfer of solids to occur.

Better yet is to pass the strawberries in concentrate through a vacuum step which will pull moisture from the berry and allow higher solids from the concentrate to replace it.

(4) Novelties

Our present tests for novelties utilize our present hard pack mix whipped and frozen to 40 percent overrun. At above this overrun, the novelties is too fragile and breaks from the stick. A coating of water or 50 percent water-50 percent fruit juice mix can be made to coat and seal the novelty bar. The hard frozen whipped novelty is simply dipped into the coating tank which freezes a coating of the lower brix coating over its surface.

The particulates and ripples discussed in (2) and (3) can also be utilized in the novelty filler molds, etc. The two part overrun concept suggested in (1) could also be used on two separate frozen mixes.

The sliced strawberries could be concentrated by vacuum without the use of the deionized juice concentrate until the natural brix fall between 20-40 brix in this way accomplishing the same concept as above.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A storable fruit juice mixture for subsequent aeration and freezing into an eatable frozen fruit juice product, said mixture comprising: a fruit juice having a brix substantially over 35 for sweetening said mixture; a fruit juice having a flavor component; a stabilizer including a blend having at least two gums; 0.05 to about 0.50 percent of a protein whipping agent; and, an amount of water to adjust a final brix of said mixture to the range of 10-35.

2. The mixture as defined in claim 1 wherein a single juice forms said fruit juice having a brix substantially over 35 and said fruit juice having a flavor component.

3. The mixture as defined in claim 1 wherein said product has an overrun of at least 50.

4. The mixture as defined in claim 1 wherein said fruit juice having a brix substantially over 35 is modified juice.

5. The mixture as defined in claim 1 wherein said stabilizer is 0.05 to about 1.5 percent by weight of said mixture.

6. The mixture as defined in claim 1 wherein said final brix is in the range of 20-30.

7. The mixture as defined in claim 1 wherein said fruit juice having a brix substantially over 35 has a brix of about 70.

8. The mixture as define in claim 1 wherein in said fruit juice having a brix substantially over 35 comprises a deionized or ultrafiltered fruit juice selected from the class consisting of apple juice, grape juice, pear juice and mixtures thereof.

9. The mixture as define in claim 1 wherein said fruit juice having a flavor component is selected from the class consisting of juice, juice concentrate, fruit puree and combinations thereof.

10. The mixture as defined in claim 1 wherein said stabilizer blend includes guar gum and carrageenan.

11. The mixture as defined in claim 1 wherein said stabilizer blend includes at least 0.20 percent xanthan gum.

12. The mixture as defined in claim 1 wherein said stabilizer blend includes guar gum and xanthan gum.

13. The mixture as defined in claim 1 wherein said stabilizer blend includes guar gum, carrageenan, and xanthan gum.

14. The mixture as defined in claim 1 wherein said stabilizer blend includes gums selected from the group consisting of guar gum, locust bean gum, carrageenan, an alginate, cellulose gum, a pectin and combinations thereof.

15. The mixture as defined in claim 1 wherein said stabilizer blend includes two or more components selected from the group consisting of guar gum, locust bean gum, xanthan gum, carrageenan, an alginate, a cellulose gum, a pectin, hydroxyethyl cellulose, hydroxypropyl cellulose, carboxymethyl cellulose, microcrystalline cellulose, amidated pectin, propylene glycol alginate, modified starches, maltodextrins, gelatin, polydextrose, hydroxypropylmethyl cellulose, methylcellulose, methylethyl cellulose, ethylcellulose, and combinations thereof.

16. The mixture defined in claim 14 wherein said stabilizer blend includes at least 0.02 percent xanthan gum.

17. The mixture defined in claim 1 wherein said stabilizer blend is 0.20 to about 1.0 percent by weight of said mixture.

18. The mixture defined in claim 1 wherein said stabilizer blend is 0.30 to about 0.60 percent by weight of said mixture.

19. The mixture as defined in claim 1 wherein said stabilizer blend comprises about 0.17 to about 0.23 percent by weight of guar gum and about 0.05 to about 0.30 percent by weight carrageenan and a third gum.

20. The mixture as defined in claim 1 wherein said stabilizer blend comprises 0.17 to about 0.23 percent by weight of guar gum, about 0.05 to about 0.30 percent by weight carrageenan gum and 0.02 to about 0.30 percent xanthan gum.

21. The mixture defined in claim 20 wherein said carrageenan gum is in the range of about 0.08 to about 0.14 percent by weight of said mixture.

22. The mixture as defined in claim 19 wherein said third gum is xanthan gum.

23. The mixture as defined in claim 1 wherein adjusted brix is in ranges of 23 to about 26.

24. The mixture as define in claim 1 wherein said mixture is essentially free of added refined sugars.

25. The mixture as defined in claim 1 wherein said mixture is essentially free of added corn sweeteners.

26. The mixture as define in claim 1 wherein said protein whipping agent is selected from the group consisting of vegetable protein, animal protein, and microcrystalline cellulose.

27. The mixture as defined in claim 1 wherein said stabilizer blend includes 0.17 to about 0.23 percent by weight of guar gum.

28. The mixture as defined in claim 1 wherein said stabilizer blend includes 0.05 to 0.30 percent carrageenan.

29. The mixture as defined in claim 1 wherein said stabilizer blend includes 0.02 to about 0.30 percent xanthan gum.

30. The mixture as defined in claim 27 wherein said stabilizer blend includes 0.05 to about 0.30 percent carrageenan.

31. The mixture as defined in claim 30 wherein said stabilizer blend includes 0.02 to about 0.10 percent xanthan gum.

32. The mixture as defined in claim 27 wherein said stabilizer blend includes 0.02 to about 0.30 percent xanthan gum.

33. The mixture as defined in claim 1 wherein said mixture includes a flavoring.

34. The mixture as defined in claim 1 wherein said mixture includes a flavor enhancer.

35. The mixture as defined in claim 1 wherein said juice is selected from the group consisting of fruit juice, fruit juice concentrate, fruit puree, fruit puree concentrate, modified juice, modified juice concentrate, and combinations thereof.

36. The mixture as defined in claim 1 wherein said stabilizers are guar gum, locust bean gum, and carrageenan, and wherein the amount of said guar gum ranges from about 0.14 to about 0.24 percent by weight, wherein the amount of said locust bean gum ranges from about 0.17 to about 0.29 percent by weight, and wherein the amount of carrageenan ranges from about 0.1 to about 0.14 percent by weight.

37. The mixture as defined in claim 1 wherein said mixture has 25 percent to about 45 percent fructose and about 30 percent to 10 percent glucose and no more than 10 percent of other sweeteners of the saccrose class.

38. The mixture as defined in claim 1 wherein sufficient acid is added to adjust the mixture's tartness and pH from about 3.5 to about 5.5.

39. The mixture as defined in claim 1 wherein said stabilizer blend includes at least 0.02 percent xanthan gum.

40. The mixture as defined in claim 1 wherein said stabilizers are guar gum, carrageenan, and xanthan gum, wherein the amount of said guar gum ranges from about 0.17 to about 0.23 percent by weight, wherein the amount of carrageenan ranges from about 0.005 to about 0.30 percent by weight and about 0.07 to about 0.30 percent by weight of xanthan gum.

41. The mixture as defined in claim 1 including citric acid, malic acid, an ascorbic acid and other organic acids inherent in fruits to give a titratable acid level of 0.15 to 0.8 percent.

42. The mixture as defined in claim 1 wherein said fruit juice having a brix substantially over 35 has been treated with an ion exchange resin or subjected to ultrafiltration to form a modified juice having reduced color and flavor.

43. The mixture as defined in claim 42 wherein a flavored ingredient is added to complement any flavor removed by contact of the juice with the ion exchange resin or ultrafiltration.

44. The mixture as defined in claim 1 wherein sufficient acid is added to adjust the mixture's tartness and pH from about 2.5 to about 5.5.

45. A method of making an aerated, frozen fruit juice cream, said method comprising the steps of:
  (a) making a fruit mixture comprising a fruit juice having a brix substantially over 35 for sweetening said mixture, a fruit juice having a flavor component, a stabilizer including a blend having at least two gums, 0.05 to about 0.50 percent of a whipping agent and an amount of water to adjust the brix of said mixture to the range of 10-35;

(b) deaerating said mixture;

(c) heating said mixture to at least about 180° F.;

(d) packaging said mixture; and, (e) subsequently aerating and freezing said mixture into said cream.

46. A method of making a transportable, storable fruit juice mixture for subsequent aeration and freezing into an eatable frozen fruit juice product with an overrun of over 50, said method comprising the steps of:

(a) mixing a fruit juice having a brix substantially over 35 for sweetening said mixture, a fruit juice having a flavor component, a stabilizer including a blend having at least two gums, a whipping agent and an amount of water to adjust the brix of said mixture to the range of 20-30;

(b) heating said mixture to at least about 180° F.; and, (c) packaging said mixture for subsequent use.

47. A method of making hard pack frozen fruit juice cream, said method comprising the steps of:

(a) making a fruit juice mixture comprising a fruit juice having a brix substantially over 35 for sweetening said mixture, a fruit juice having a flavor component, a stabilizer including a blend having at least two gums one of which is xanthan gum, a whipping agent and an amount of water to adjust the brix of said mixture to the range of 10-35;

(b) heating said mixture to at least about 180° F.;

(c) aerating said freezing said mixture to an overrun of between 20-150 percent to produce a soft pack product; and, (d) holding said frozen mixture for a prolonged time at a temperature less than about minus 10° C. to produce a hard pack product.

48. A method of making an aerated, frozen, soft, fruit juice product, said method comprising the steps of:

(a) making fruit juice mixture comprising a fruit juice having a brix substantially over 35 for sweetening said mixture, a fruit juice having a flavor component, a stabilizer including a blend having at least two gums, a whipping agent, and, an amount of water to adjust the brix of said mixture to the range of 10-35; and, (b) aerating and freezing said mixture to an overrun of between 20-150 percent.

49. A storable fruit juice mixture for subsequent aeration and freezing into an eatable frozen fruit juice product, said mixture comprising: a fruit juice having a brix substantially over 35 for sweetening said mixture; a fruit juice having a flavor component; a stabilizer including a blend having at least guar gum, carrageenan and xanthan gum; 0.05 to about 0.50 percent of a protein whipping agent; and, an amount of water to adjust a final brix of said mixture to the range of 10-35.

50. A storable fruit juice mixture as defined in claim 49 including a cellulose gum.

51. A storable fruit juice mixture as defined in claim 49 including modified starch.

52. A frozen aerated fruit juice non-dairy product having at least 50 percent overrun and being eaten as frozen with an overrun in the range of 40-90 percent, comprising: at least one modified fruit juice having a brix substantially over 35 for sweetening said mixture; from about 0.05 percent to about 1.5 percent by weight of a blend of stabilizers based upon the total weight of said product, from about 0.05 percent to about 0.15 percent by weight of a natural protein whipping agent based upon the total weight of said product; an amount of added water and including remaining ingredients selected from the group consisting of flavoring, spices, flavor enhancers, organic acids, and mixtures thereof such that the added water adjusts said product to an overall brix value of from about 10 to about 35.

53. A frozen fruit juice product according to claim 52 wherein said blend of stabilizers includes natural gums selected from the group consisting of guar gum, locust bean gum, xanthan gum, carrageenan, an alginate, a cellulose gum, a pectin, and combinations thereof.

54. A frozen fruit juice product according to claim 52 wherein said modified fruit juice is essentially the only added sweetener.

55. A frozen fruit juice product according to claim 52 wherein the overall amount of said blend of stabilizers is from about 0.35 percent to about 0.60 percent by weight of said product.

56. A frozen fruit juice product according to claim 52 wherein the amount of protein whipping agent ranges from about 0.05 to about 0.15 percent by weight of said product.

57. A frozen aerated fruit juice non-dairy product comprising: at least one type of fruit juice having a brix substantially over 35 for sweetening said mixture; from about 0.05 percent to about 1.5 percent by weight of a stabilizer blend based upon the total weight of said product with the provision that the blend contain xanthan gum; from about 0.05 percent to about 0.50 percent by weight of a natural protein whipping agent based upon the total weight of said product; an amount of added water and remaining ingredients selected from the group consisting of flavoring, spices, flavor enhancers and edible organic acids and mixtures thereof with the amount of added water providing an overall brix value of from about 20 to about 30 and said product having an overrun in the general range of 40-90 percent, wherein said frozen fruit juice product has a smooth creamy appearance and good low temperature storage properties.

58. A storable fruit juice mixture for subsequent aeration and freezing into an eatable frozen fruit juice, product, said mixture comprising:

(a) a fruit juice having a flavor component;

(b) a fruit juice having a brix substantially over 35 for sweetening said mixture;

(c) 0.05-1.5 percent by weight of a stabilizer including a blend having at least two gums;

(d) a pH control agent;

(e) 0.05 to about 0.50 percent of a whipping agent; and, (f) an amount of water to adjust a final brix of said mixture to the range of 10-35.

* * * * *